United States Patent [19]
Lauzeral et al.

[11] 3,983,036
[45] Sept. 28, 1976

[54] METHOD AND DEVICE FOR UNCLOGGING FILTER CLOTHS

[75] Inventors: Jean Lauzeral; Christian Laville, both of Gaillac, France

[73] Assignee: European Atomic Energy Community (Euratom), Luxemburg, Luxemburg

[22] Filed: Nov. 19, 1973

[21] Appl. No.: 417,206

[30] Foreign Application Priority Data
Nov. 21, 1972  France .............................. 72.42328

[52] U.S. Cl. .............................. 210/356; 210/391
[51] Int. Cl.² .......................................... B01D 35/20
[58] Field of Search ........ 210/19, 341, 356, DIG. 3; 55/290, 291, 292, 293

[56] References Cited
UNITED STATES PATENTS

| | | | |
|---|---|---|---|
| 1,791,251 | 2/1931 | Shimmin | 210/356 |
| 3,096,279 | 7/1963 | Komline | 210/391 |
| 3,144,409 | 8/1964 | Jauhola | 210/391 |
| 3,707,230 | 12/1972 | Davidson | 210/391 X |
| 3,814,259 | 6/1974 | Kamimura et al. | 210/DIG. 3 |
| 3,836,681 | 9/1974 | Dudd | 210/77 X |

*Primary Examiner*—Frank A. Spear, Jr.
*Attorney, Agent, or Firm*—Stevens, Davis, Miller & Mosher

[57] ABSTRACT

A method and device for unclogging filter cloths for use in filter apparatus particularly apparatus of the kind wherein the cloth describes a closed loop between a filtering station and an unclogging station.

Gas is ejected from one or more nozzles through the cloth which is vibrated at a sonic and/or ultrasonic frequency at a location opposite the nozzle ejection head. The cloth is simultaneously stretched at the same location into a projecting shape having leading and trailing edges with a length, in the direction of motion of the cloth, of not more than three times their height in the direction perpendicular to the direction of motion of the cloth.

8 Claims, 6 Drawing Figures

METHOD AND DEVICE FOR UNCLOGGING FILTER CLOTHS

The invention relates to a method and device for unclogging filter cloths, for example, for cloths for use in filter apparatus of the kind comprising a filter cloth which moves relative to articulated nozzles ejecting an unclogging gas or gas mixture through the cloth.

Filter apparatus of this kind is known in which the filter cloth describes a closed loop when it travels into a screening and filtering station where the products to be treated undergo a first filtering treatment, and into a downstream unclogging station where substances which have not passed through the filter cloth are removed and where the dirty cloth is continuously unclogged.

The unclogging system used in the aforementioned devices comprises nozzles for ejecting unclogging fluids through the cloth, the ejection heads of the nozzles being movable perpendicularly to the cloth, under the action of weights provided for the purpose, so as to follow the deformations of the cloth.

The aforementioned unclogging systems use articulated nozzles, so that the blowing nozzle can be brought near the cloth without subjecting it to wear by contact, owing to the film of fluid produced between the nozzle and the cloth, thus increasing the efficiency of the unclogging operation. However, the system has the disadvantage that, in many cases, the cloth is not completely and totally unclogged, more particularly when the products soiling the cloth adhere strongly, either because of their nature, e.g. in the case of sugar products, inter alia certain kinds of grape juice, or because of electrostatic charges which have accumulated in the cloth, or for both reasons at once.

In such cases, the cloth must be additionally cleaned by auxiliary means such as rotating brushes and/or a negative-pressure chamber acting on the side of the cloth opposite the side towards which the jet of cleaning fluid is directed; an anti-static device may be provided, if required.

However, it is found that the device has to be periodically stopped and taken out of service, so that the cloth can be thoroughly cleaned by manual means.

According to one aspect of the present invention there is provided a method of unclogging a filter cloth moving relative to one or more articulated nozzles which method comprises ejecting a gas or gas mixture from the nozzle or nozzles through the cloth, wherein the cloth is vibrated at a sonic and/or ultrasonic frequency opposite each nozzle ejection head under the effect of the gas jet travelling through it at the corresponding position and the cloth is simultaneously stretched at the same position and given a projecting shape having leading and trailing edges which edges have a length in the direction of motion of the filter cloth relative to the nozzle of not more than three times their height in the direction perpendicular to the direction of motion of the cloth.

Preferably the length of the leading and trailing edges of the projecting shape is not more than the height thereof.

Advantageously the jet of gas, or a mixture of gases, leaving the nozzles has a speed equivalent to the speed of sound in air or to a speed within 20% more or less of the speed of sound in air and the nozzle ejection heads are maintained permanently at a distance from the cloth not exceeding 2 millimeters.

The outlet ends of the nozzles may be kept at the desired optimum distance from the filter cloth, without any contact therewith, by pressure on the nozzles exerted by means pressing the nozzles against the cloth, combined with repulsion between the nozzles and the cloth, due to an air cushion effect which effect may be obtained by using a part of the flow of the unclogging gas.

According to a further aspect of the present invention there is provided a device for unclogging a filter cloth moving relative to one or more articulated nozzles ejecting gas or gas mixture through the cloth, comprising one or more articulated nozzles wherein the or each nozzle has means for pushing its ejection head in the direction of the cloth, each ejection head having an internal cross-section such that when the nozzle is connected to a gas generator the gas from the generator is ejected at a speed in the range of 20% less than the speed of sound in air to 20% more than the speed of sound in air, each ejection head being adapted to provide at least one jet of gas through the cloth and an air or gas cushion between the cloth and the outlet end of the ejection head.

Preferably the ejection head of the articulated nozzle comprises a slot substantially perpendicular to the edges of the cloth, each lip of the slot being externally provided with a substantially semi-cylindrical cross-section, the outer walls of the head being surrounded by a cover which is open towards the cloth.

Alternatively the ejection head may have two slots, which may or may not be parallel, and are substantially perpendicular to the direction of advance of the cloth, the lips of each slot being externally provided with a substantially semi-cylindrical cross-section, the gas jets via the slots being ejected in directions which diverge through an angle between 0° and 20°, the head being hollow between the two slots.

The invention will now be described, by way of example only, with reference to the accompanying drawings in which.

Figure 1:
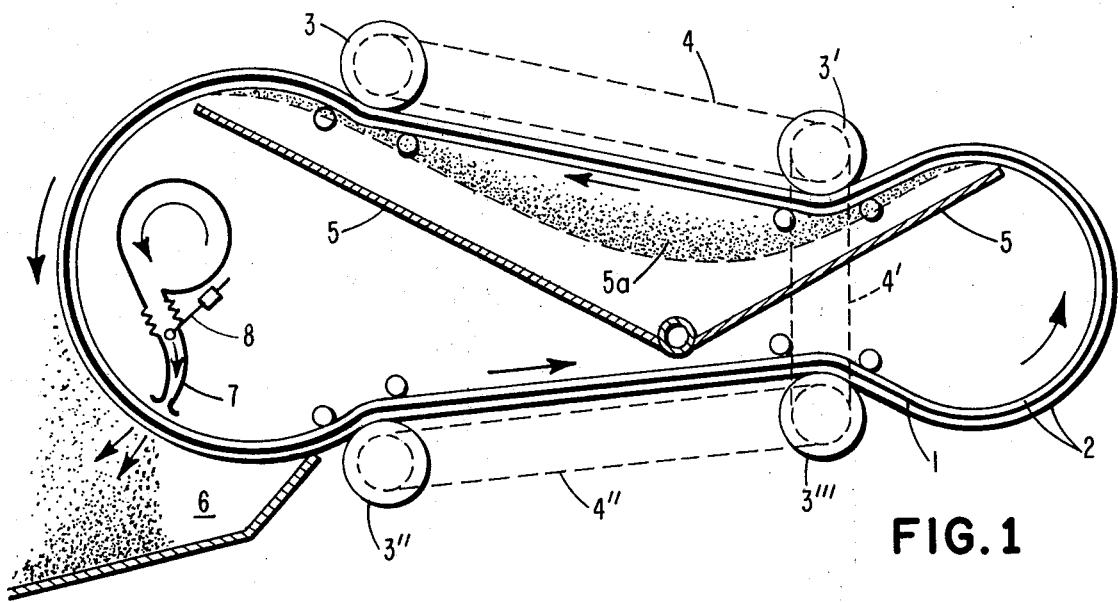
FIG. 1 is a diagrammatic longitudinal section through a filter device of the kind to which the unclogging device according to the invention may be applied.

Referring first to FIG. 1, reference 1 denotes a filter cloth, made e.g. of nylon, in a filter apparatus laterally mounted between two parallel resilient chains 2 which drive the device.

References 3,3',3'',3''' denote gearwheels, e.g. stud gearwheels, which drive chains 2, and which are connected by chains 4, 4', 4'' and rotate at the same speed.

At its sides, the filter cloth 1 has a resilient, sealing-tight edge (not shown in the drawing), comprising an air chamber and, in the top part of the apparatus opposite gearwheels 3 and 3', forming the screening and filtering station where the product to be processed is loaded. Owing to the deformation of the cloth and the resilient edge, the station takes the form of a filter tank 5a having movable walls and a movable bottom.

Reference 5 denotes a tank for collecting the product which has been filtered and screened in the screening and filtering station, before the product is discharged.

Substances which have not passed through filter 1 are subsequently processed in an unclogging station 6 disposed in the bottom part of the apparatus, where cloth 1 is tightly stretched.

The substances clogging the filter cloth are expelled partly by gravity but mainly by a jet of fluid or a mixture of fluids under pressure, acting substantially perpendicular to the cloth 1 through which it travels, the jet being supplied by nozzles or sprayers 7 which are articulated or movable so as to maintain the jet perpendicular to the cloth. The jets can follow all the deformations of the cloth, more particularly those due to the pressure of the unclogging fluid.

An adjustable counterweight device 8 regulates the distance between the end of nozzle 7 and cloth 1.

Figure 2:
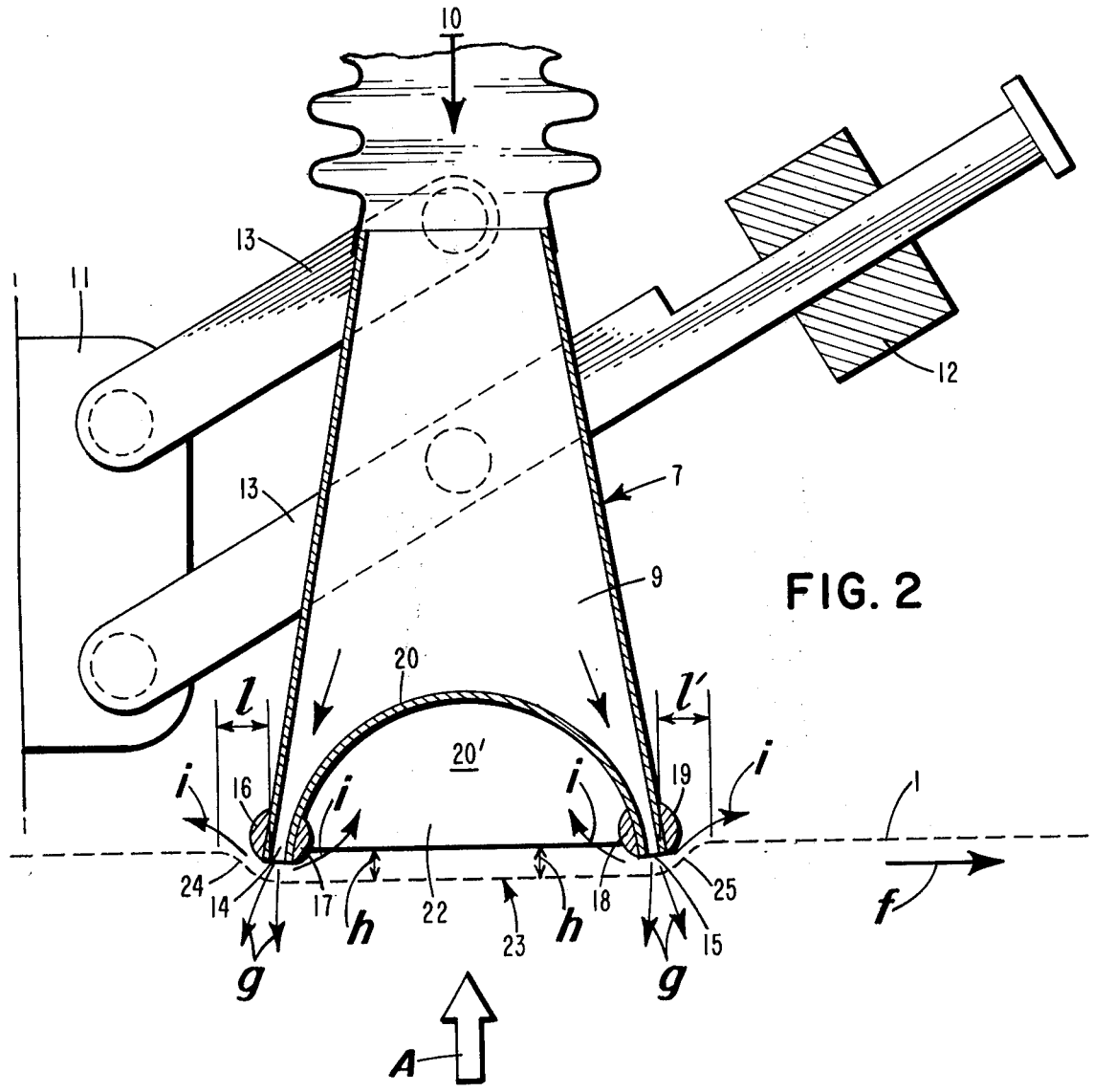
FIGS. 2 and 3 are cross-sections of two embodiments of the unclogging device according to the invention, provided with ejection heads having two slots.

As shown in FIG. 2, which relates to the unclogging system according to the invention, filter cloth 1 moves in the direction of arrow $f$ with respect to the ejection head 9 of the articulated nozzle 7 supplying unclogging gases moving in front of the ejection head.

The unclogging station may comprise a single nozzle 7 or a number of articulated nozzles such as nozzle 7, forming two or more inter-crossing lines if necessary. All the articulated nozzles in the unclogging station are connected to a gas generator, not shown on the drawing, which is diagrammatically indicated by 10 in FIG. 2 and which can be a mechanical compressor or a boiler, either (a) in the case where the gas is water vapor alone or (b) an air-vapor mixture in the case where an ejector is used as the starting source, or, finally, in the case where each nozzle itself constitutes a vapor-air ejector.

In order to enable head 9 permanently to follow all the movements of cloth 1, head 9 is permanently subjected to a force pushing it towards cloth 1, as in the device shown in FIG. 1, by means of a counterweight system mounted on a support base 11 and comprising a counterweight 12 and a deformable parallelogram 13, which ensures that nozzle 7 always moves at right angles to cloth 1.

If required, nozzle 7 can make a lateral reciprocating scanning movement, resulting from motion of the base 11 perpendicular to the direction $f$ of motion of cloth 1.

The ejection head 9 of the or each nozzle 7 in the unclogging station has an internal cross-section designed so that the gas or gases leaving head 9 travels at the speed of sound, within 20% more or less, so that cloth 1 is vibrated opposite each ejection head 9 at a sonic and/or ultrasonic frequency by the gas travelling through the cloth at the corresponding position.

Head 9 has two outlet slots 14, 15 at a distance from one another, which may or may not be parallel and which are substantially perpendicular to the direction of advance $f$ of cloth 1, so that the end of the head 9 of the or each nozzle 7 in the unclogging station is permanently maintained at an optimum distance from the cloth 1, i.e., at the minimum distance sufficient to prevent contact between head 9 and cloth 1 while enabling the cloth to vibrate.

Each outer lip of slots 14, 15 has a substantially semi-cylindrical external cross-section 16, 17 and 18, 19 respectively.

Slots 14, 15 are so disposed that they eject gas jets in directions which diverge through an angle between 0° and 20°.

Figure 4:
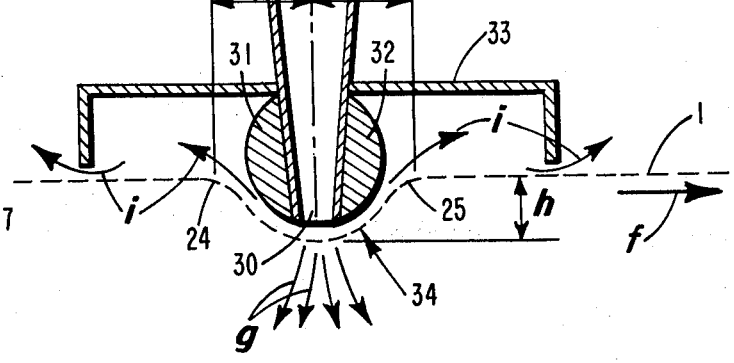
FIG. 4 is a view in the direction of the arrow A of the device in FIGS. 2 and 3.

Slots 14, 15 are connected towards the interior of head 9 by a semi-cylindrical wall 20 forming a hollow 20' opposite cloth 1; the two side ends of the hollow are sealed by walls 21, 22 (see FIG. 4).

The jets of unclogging gas emitted through slots 14, 15 travel through cloth 1 in the direction shown by arrows $g$, but a part of the flow ejected through the slots is guided by the cross-sections 16, 17, 18, 19 and follows arrows $i$, thus providing an air-cushion effect maintaining head 9 at the optimum distance from cloth 1. The air-cushion effect occurs not only opposite the lips of slots 14 and 15, thus advantageously preventing any contact between the cloth and head 9 and consequently any wear of the cloth, but also opposite hollow 20', so that cloth 1 can be tensioned between slots 14 and 15. Consequently, cloth 1 is tensioned opposite head 9, thus improving the vibration and simultaneously curving the cloth to a considerable extent into a protruding shape 23.

It should be noted that the divergence, if any, of the jets also assists and reinforces the air-cushion effect, more particularly opposite outlets 14 and 15. The divergence also results in more thorough unclogging of cloth 1, since the unclogging fluid acts on the cloth from two angles.

It has been shown that, in order to obtain optimum results, projection 23 should be such that its leading edge 24 and its trailing edge 25 have a length $l$ and $l'$ respectively, which is not more than three times their height $h$. Preferably, lengths $l$ and $l'$ are the same or at most equal to the height $h$.

It has been found that preferably the distance between the end of the ejection head 9 and the vibrating cloth 1, should be not greater than 2 millimeters. This is permanently maintained by the balance between the two opposing forces acting on head 9, i.e., a long-range force provided by the counterweight device 12, 13 pushing the head towards the cloth, and a short-range force of repulsion between the cloth and the head, which is provided by the aforementioned air or gas-cushion effect resulting from the slots in conjunction with the cross-sections and the hollow. The ejection head itself sends a gas jet at sonic speed through the cloth, thus vibrating the cloth, and itself provides the air-cushion effect between the cloth and the outlet end of the head.

According to the invention, therefore, the ejection head is constructed so that the cloth is given a shape which projects opposite each ejection nozzle, the leading and trailing edges of the projection having the required curvature, and the cloth being tensioned and vibrated at sonic and/or ultrasonic frequency.

In connection with the construction according to the invention, it has been shown that a much more powerful unclogging action than in known systems can be obtained by combining the following three effects: the sonic and/or ultrasonic vibration of the cloth, the considerable curvature 23 of the cloth and the tension thereof, all occurring at the same place, i.e., opposite the ejection head.

Accordingly, when the unclogging system according to the invention is used in known devices as in FIG. 1, it enables the device to operate continuously, without the need for any additional means or any human intervention for cleaning the cloth.

Figure 3:
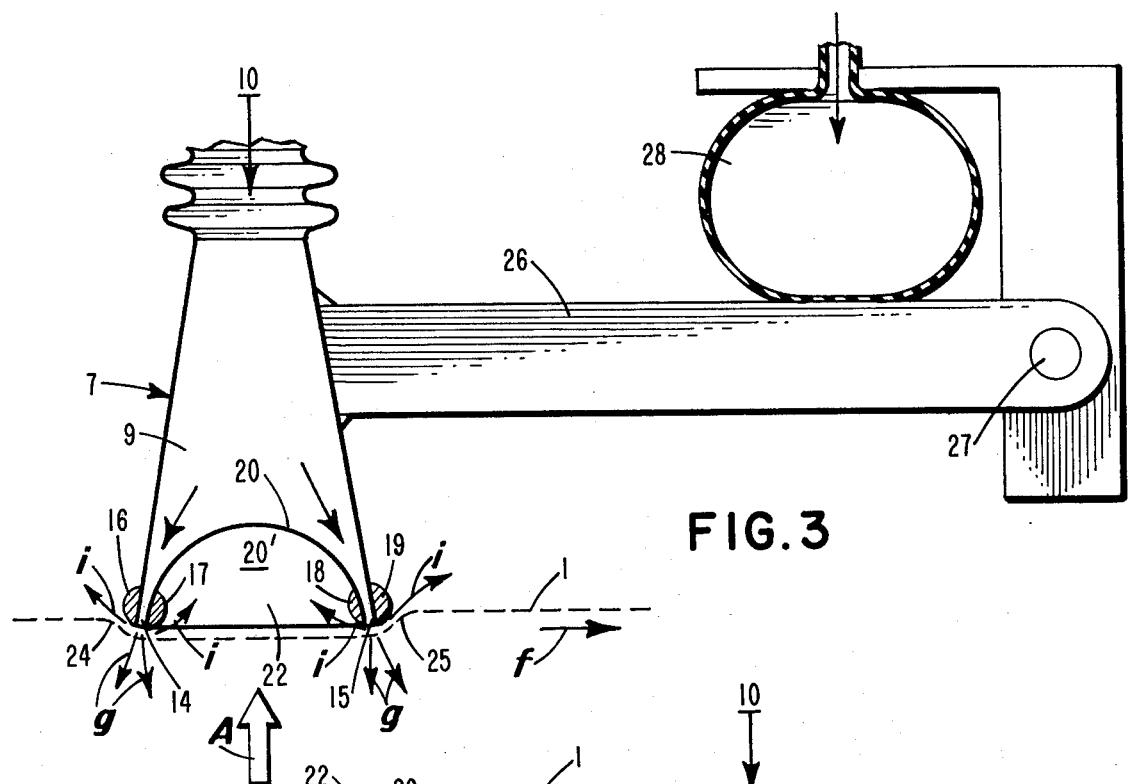
Figure 5:
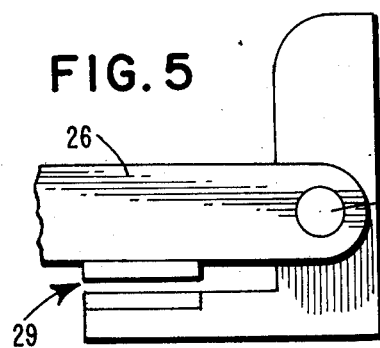
FIG. 5 shows an alternative embodiment of the device in FIG. 3.

FIGS. 3 and 5 illustrate two alternative embodiments of the device for pressing head 9 towards the cloth.

A lever 26 is secured at one end to nozzle 7 and secured at the other end around a pivot 27. Lever 26 is acted upon by a pneumatic or hydraulic piston system 28 (see FIG. 3) or, in the second embodiment (FIG. 5) a magnet system 29 which has the advantage of exerting a return force towards the cloth in a very simple manner, the force varying with the square of the distance of lever 26, so that head 9 never moves away from the cloth.

Figure 6:
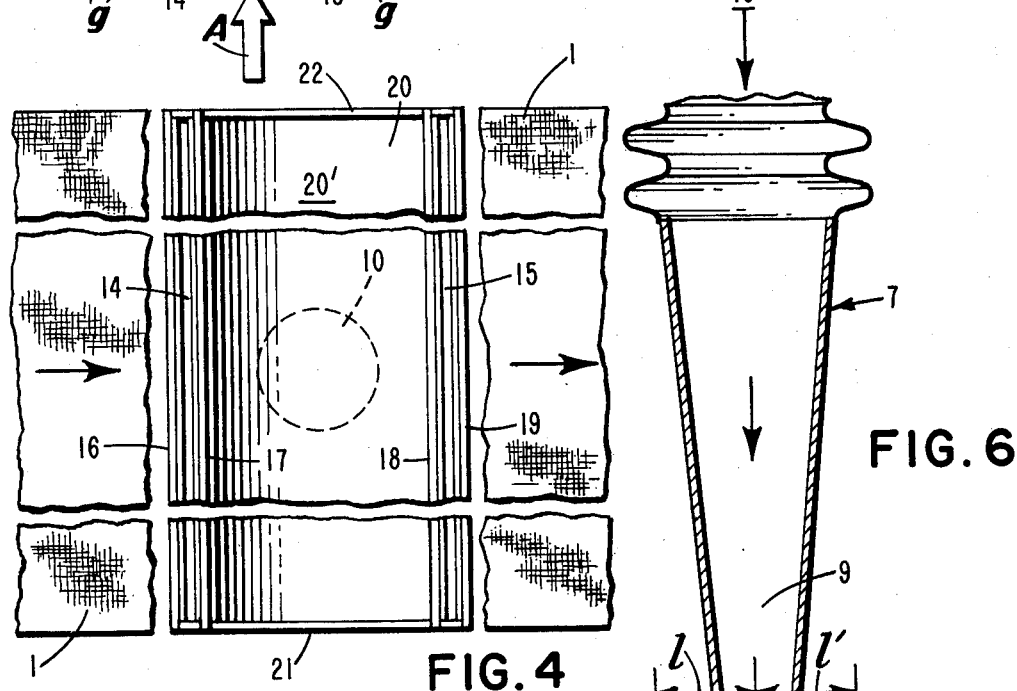
FIG. 6 is a cross-section of an embodiment of an ejection head having a single slot.

FIG. 6 shows an alternative embodiment of the ejection head according to the invention, comprising only a single outlet slot 30 substantially perpendicular to the direction of advance $f$ of cloth 1.

In the same manner as in FIGS. 2 and 3, each outer lip of slot 30 has a substantially semi-cylindrical external cross-section 31 and 32 which, as before, reinforces the air or gas-cushion effect between the cloth 1 and head 9, by providing a support for the head.

A cover 33, open towards cloth 1, is secured on head 9. The gas required for forming the air cushion is taken from the main gas jet (represented by arrows $g$) from which it escapes in the direction of arrows $i$.

Cover 33 considerably increases the surface of the air cushion, thus stretching the cloth in front of and behind the single unclogging jet and the projection 34 produced by the jet in the cloth. The cloth is also vibrated.

The reinforced air-cushion effect also lifts the nozzle sufficiently to avoid any obstacle, whether normal (e.g. a seam in the cloth) or accidental (an object).

In general, in order to obtain the aforementioned effects, the total area of all the nozzle apertures opposite the cloth should vary in inverse proportion to the flow aperture for the gas, as a percentage of the total area of the cloth.

It is to be understood that the invention is not limited to the aforementioned exemplary applications, but includes all variants thereof within the scope of the appended claims. For example, without departing from the scope of the invention, use can be made of non-rectilinear slots 14, 15 or 30. The pneumatic or hydraulic piston system 28 or the magnet system 29 can be applied to a parallelogram system as shown in FIG. 2.

The device described above has the advantage that it provides unclogging conditions such that the filter cloth is completely unclogged under all conditions irrespective of the nature of the products to be processed, and an unclogging system such that the filter device can be continuously used for 24 hours a day without human intervention and without stopping, even in the case of substances which adhere most to the cloth.

Furthermore the special design of the ejection heads of the nozzles or sprayers supplying the gas, ensures that there is no contact between the ejection heads and the cloth, even when the latter is being vigorously cleaned, thus preventing all wear of the cloth, reducing costs, and simplifying maintenance, more particularly during continuous operation.

We claim:

1. Apparatus for cleaning a filter cloth, comprising: a nozzle having a head with a slot for ejecting a jet of cleaning gas, a part of which passes through the cloth; means for moving the cloth across said head; means for locating said nozzle at a minimal distance from the cloth, said locating means being responsive to a reaction of a jet of gas against the cloth, wherein said head has an internal profile such that gas is ejected from said slot at a speed which is within 20% of the speed of sound in air and in which the slot opens substantially perpendicular to the direction of movement of the cloth across said head, and wherein said means for locating includes, on the exterior of said head at opposite sides of said slot, outer lips of semi-cylindrical profile, said lips forming with the cloth when the cloth is moved across said head a bifurcated restricted path having branches about said lips for the part of the gas which does not pass through the cloth.

2. Apparatus according to claim 1 further comprising a housing opening towards the cloth and surrounding the exterior of said head and said outer lips.

3. Apparatus according to claim 1 wherein said means for locating includes means for pushing said head toward the cloth, said pushing means including a pneumatic piston.

4. Apparatus according to claim 1 wherein said means for locating includes means for pushing said head toward the cloth, said pushing means including magnetic means.

5. Apparatus according to claim 1 wherein said means for locating includes means for pushing said head toward the cloth, said pushing means including an hydraulic piston.

6. Apparatus according to claim 1 wherein said head includes two spaced apart slots which open substantially perpendicular to the direction of movement of the cloth across said head and are arranged successively in the direction of movement of the cloth, and said head has a semi-cylindrical wall between said two slots to form a chamber between said wall and the cloth, and wherein said means for locating includes outer lips of semi-cylindrical profile on the exterior of said head at opposite sides of each of said two slots.

7. Apparatus according to claim 6 wherein one of said lips at each of said slots extends into said chamber, and all of said lips at both of said slots form bifurcated restricted paths having branches about said lips, whereby gas may flow about each of said one lips into said chamber.

8. Apparatus according to claim 7 wherein said head including said slots have shapes to cause the cloth to project in the vicinity of said head when there is a flow of gas, the projection having a leading edge and a trailing edge near said respective slots, said head including said slots providing a gas pressure such that the length $l$ of the leading and trailing edge is not more than three times the height $h$ of the projection.

* * * * *